United States Patent [19]

Mattes

[11] 4,141,629

[45] Feb. 27, 1979

[54] INDICATION OF SCENES ON A PROJECTOR PROGRAMMED ON THE BASIS OF SCENES

[75] Inventor: Gerd Mattes, Schorndorf, Fed. Rep. of Germany

[73] Assignee: Robert Bosch GmbH, Stuttgart, Fed. Rep. of Germany

[21] Appl. No.: 896,764

[22] Filed: Apr. 17, 1978

[30] Foreign Application Priority Data

Apr. 21, 1977 [DE] Fed. Rep. of Germany ....... 2717688

[51] Int. Cl.² ............................................. G03B 31/02
[52] U.S. Cl. ........................................ 352/27; 352/5; 352/129; 352/171; 352/173
[58] Field of Search ..................... 352/5, 27, 129, 173, 352/124, 171

[56] References Cited

U.S. PATENT DOCUMENTS

| | | | |
|---|---|---|---|
| 2,227,201 | 12/1940 | Ross | 352/5 |
| 3,196,454 | 7/1965 | Fine | 352/5 |
| 3,376,093 | 4/1968 | Freudenschuss | 352/5 |
| 3,656,843 | 4/1972 | Misch | 352/129 |
| 3,734,602 | 5/1973 | Deck | 352/124 |
| 3,993,404 | 11/1976 | Coomer et al. | 352/173 |

Primary Examiner—Monroe H. Hayes
Attorney, Agent, or Firm—Michael J. Striker

[57] ABSTRACT

A recording projector for sound motion-picture film is used to do dubbing or rerecording work. The operator presses a store button to store the frame count of the frame being projected, and in this way stores all the frame counts for the starts and ends of several scenes, after which dubbing work is done on the thusly defined scenes. The current frame count of the film is indicated using an electronic multi-digit display unit having a row of controllable digit zones each of the 7-segment type and having controllable decimal point places. The multi-digit display unit is mounted upside-down, so that the decimal-point places are near the tops of the digit zones. The frame count is displayed on the digit zones with conventional appearance. The number of decimal-point places made visible at any given time indicates the number of the scene involved, both during initial frame-count storing work and during post-storing work on the scenes. If, during frame-count storing work, the operator tries to command storage of a frame count which intrudes into an already defined scene, the word "ERROR" is spelled out on the digit segments of the multi-digit display unit.

8 Claims, 4 Drawing Figures

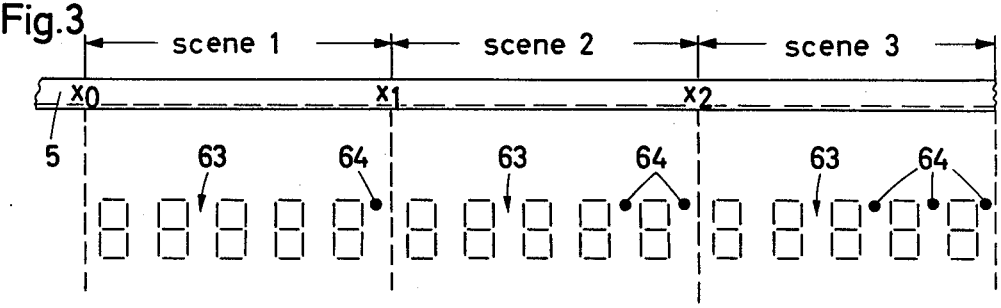
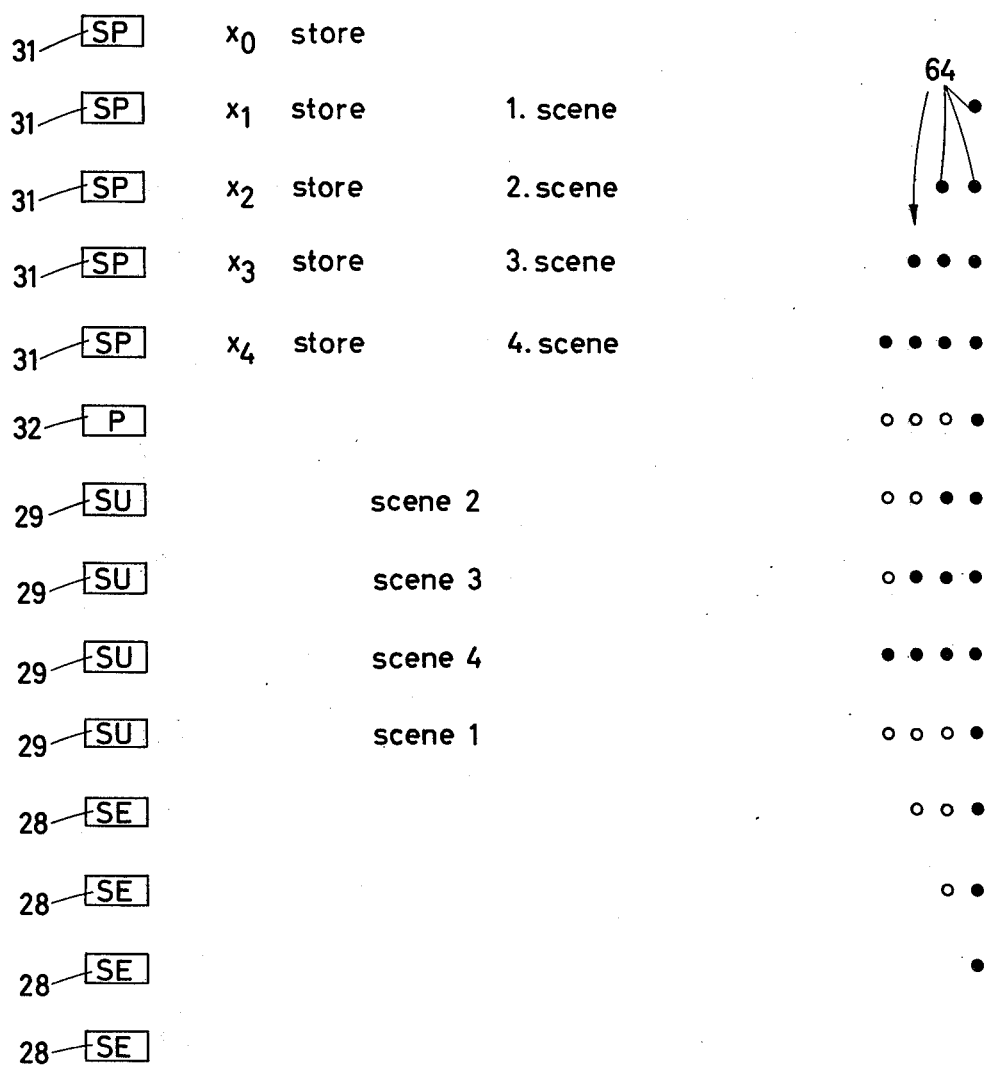

INDICATION OF SCENES ON A PROJECTOR PROGRAMMED ON THE BASIS OF SCENES

CROSS-REFERENCE TO RELATED APPLICATION

The present application discloses subject matter which can be used in the context of the method and system disclosed in copending, commonly assigned U.S. patent application Ser. No.: 877,352, of Horst Sicha et al., filed Feb. 13, 1978 and entitled "METHOD AND APPARATUS FOR AUTOMATIC IMPLEMENTATION OF FADE-IN, FADE-OUT AND FADE-OVER RECORDING EFFECTS ON FILM," the entire disclosure of which is incorporated herein by reference.

BACKGROUND OF THE INVENTION

The present invention relates to sound-film motion-picture projectors of the type used for dubbing, rerecording or other editing or special-effects work. The above-identified commonly assigned copending patent application discloses a projection system of this type designed to greatly facilitate the work done when, for example, dubbing or rerecording. First, the operator establishes the scene-transition locations on the film where recording-transition effects are to be performed. Such an effect may be an audio fadeover coinciding with an image-fadeover transition, or a simple audio fade-out at the end of a scene, a simple audio fade-in at the start of a scene, or a fade-in, fade-out or fade-over to be effected right in the middle of a scene.

To facilitate such work, that application discloses a system wherein the operator advances the film, either manually or during normal-speed full-light projection; when the start of a scene is being projected the operator presses a store button, and a minicomputer stores the frame count for the scene-start; likewise when the end of the scene is being projected the operator again presses the store button, and the minicomputer stores the frame count for the scene-end. After this scene-start and scene-end frame-count information has been stored and other programming of the system finished, dubbing or rerecording work starts. The operator switches the system over into automatic or semiautomatic operation, and among the things the system then does is to perform a high-spaced rewind to a location ahead of the scene-start, followed by a switchover into forwards transport, and including the increasing and/or decreasing of the recording level pertaining to one or more sources of audio information at the times proper for the desired scene-transition effect, these operations being performed automatically or semiautomatically, e.g., when a certain amount of operator intervention is to be provided for.

With that system, the operator may program the system and then dub on a scene-by-scene basis; i.e., first he stores the scene-start and scene-end frame counts for one scene, whereafter he dubs that scene, and only then begins work on the next scene. Alternatively, the operator may command storage of the scene-start and scene-end frame counts for all the scenes on the whole film, and only thereafter begin to dub the thusly defined scenes, one after another.

Especially when the operator stores the transition-location frame counts for a whole sequence of scenes before doing any recording work upon them, a certain amount of confusion can arise for him, both during the frame-count storing work and thereafter during actual recording work. In particular, the operator must somehow keep track of which scene in such a sequence of scenes he has reached, whether during frame-count storing work or thereafter during recording work. The frame-count indicator of the projector provides the operator with only very raw information, not directly correlatable with individual scenes, and the operator must refer both to the frame-count indicator and to, for example, a jotted-down list of all stored transition-location frame counts and/or, if the recorded images are familiar, must refer additionally to the projected image per se. This can be very distracting and inefficient.

SUMMARY OF THE INVENTION

It is a general object of the invention to provide some means which will assist the operator in knowing, at each point of his work, which scene he is working on.

One way in which this could be done is to provide a scene-number indicator, which would simply indicate numerically which scene is being worked on. For example, when working on scene #1, the scene-number indicator would indicate "1", when working on scene #2 the scene-number indicator would indicate "2", etc. Another way in which such an indication could be provided would be by using a row of indicator lamps, successive ones of which become illuminated as successive scenes are being worked on.

Of the various ways in which the successive scenes could thusly be indicated, the one which I consider best is a novel one in which the latent decimal-point capability of conventional multi-digit display units, e.g., of the type used on calculators, is exploited for the purpose of scene-number indication. By using for the frame-count indicator of the projector a conventional multi-digit display unit having decimal-point capability, and by then utilizing the otherwise unneeded decimal-point capability for indicating scene-number, I am able to achieve a compact indication for both frame count and scene-number, without additional cost, structure or complexity.

To indicate scene-number by exploiting the decimal-point capabilities of a multi-digit display unit, I contemplate using successive decimal-point places to indicate successive scene-numbers. For example, the lowest-value decimal-point place can be illuminated to indicate scene #1, the next-lowest-value place to indicate scene #2, etc. In the preferred mode of practicing the invention, not merely the differing decimal-point places but additionally the number of illuminated decimal-point places is employed for indicating purposes. Thus, when the first scene is being worked on, the rightmost decimal-point place is illuminated alone to indicate #1; the rightmost two decimal-point places are illuminated alone to indicate #2; the rightmost three decimal-point places are illuminated alone to indicate #3; and so forth.

Persons familiar with display techniques will appreciate that utilizing the latent decimal-point capability of such a multi-digit display unit is very simple, does not interfere with frame-count display, and indeed can even involve less cost for driving circuitry than if a separate digital display unit were utilized for scene-number.

When decimal-point places are utilized in this way, I particularly prefer that the multi-digit display unit be arranged upside-down on the projector, i.e., so that the illuminated decimal points are located at the tops, not as ordinarily at the bottoms, of the digits of the display unit. This can be done when the digits of the display unit are for example of the conventional 7-segment type; i.e., even though the display unit is mounted upside-down, the geometry of the 7-segment digits is the same, and therefore the correct frame counts can still be displayed.

In this way, the operator of the projector, particularly for example when he is first getting accustomed to the projector, will immediately see that the significance of the illuminated decimal points of the display is not ordinary decimal-point significance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 depicts how the available decimal-point places are utilized for the indication of a first, a second and a third scene, using a conventional 5-digit display unit of the 7-segment type; and FIG. 4 depicts what indications are given during use of the type of recording system in question, both during the storing of transition-location frame counts, and also for post-storing recording work.

DESCRIPTION OF THE PREFERRED EMBODIMENTS

Figure 1:
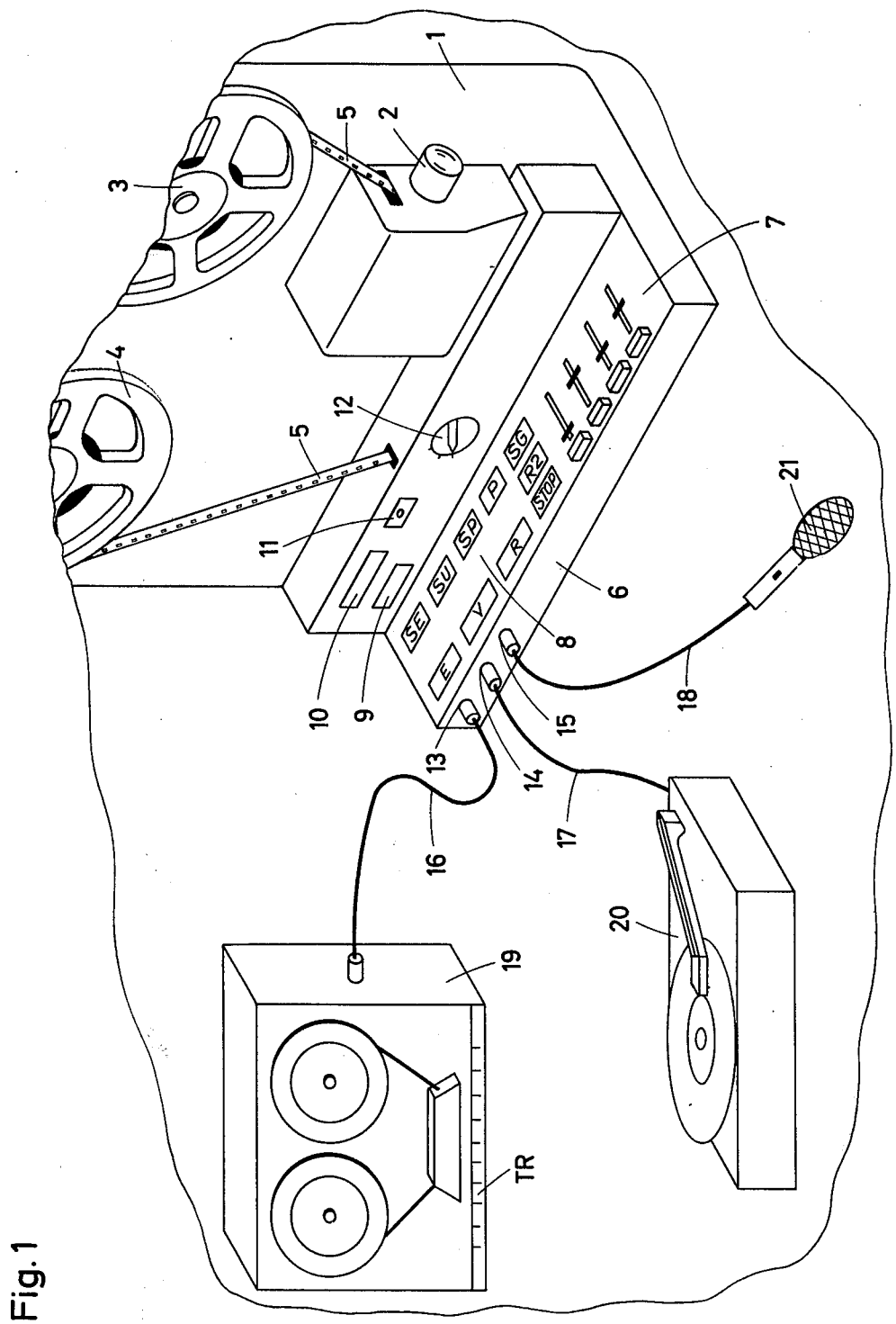
FIG. 1 is a perspective depiction of the type of set-up used for performing dubbing or rerecording work.

The subject matter disclosed herein can be used in the context of the system and method disclosed in the copending commonly assigned application identified earlier, the entire disclosure of which is incorporated herein by reference. For the sake of convenience, the basics of such a system and method are illustrated herein and reviewed as follows:

FIG. 1 depicts an exemplary set-up for doing dubbing work. Numeral 1 denotes a recording sound motion-picture film projector, numeral 2 its projection objective, numerals 3 and 4 the film reels and numeral 5 the sound motion-picture film.

The projector 1 has a control panel 6, subdivided into a mixing panel 7 and a command panel 8. Mixing panel 7 is used for manual control of the recording and playback amplifier of the projector, e.g., to set the recording level for different audio sources feeding into the projector. The command panel 8 is provided with a set of user-activated operation switches, commanding the performance of certain operations. The vertical housing wall directly above the command panel 8 includes a recording-level indicator 9, a window 10 in which is positioned a frame-count indicator, a reset ("zero") button 11 for the frame (film increment) counter of the projector, and a selector switch 12 for selecting different types of recording-transition effects.

The frontmost vertical surface of the projector housing is provided with three input sockets 13, 14, 15 into which can be plugged the jacks of recording cables 16 and 17 and a microphone cable 18. These cables can be connected to a magnetic-tape audio playback machine 19 (TR), a phonograph-record playback machine 20, and a microphone 21.

Figure 2:
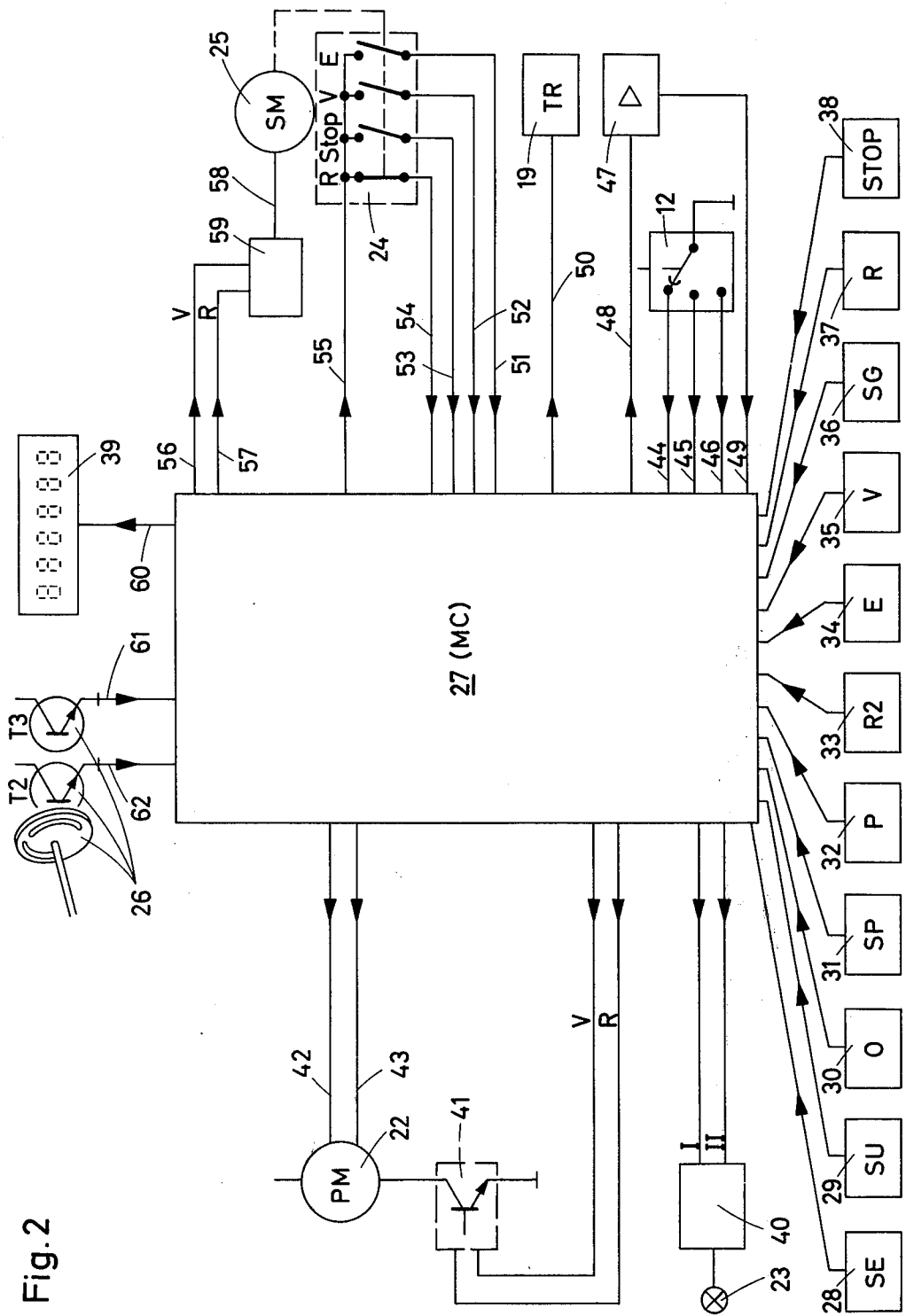
FIG. 2 is a block circuit depiction of the internal components of the projector of FIG. 1.

FIG. 2 depicts the internal components of the projector 1. These include a projector motor 22 (PM) for film transport, a projector lamp 23, a central switching and control unit 24 for changing the settings of mechanical projector components (such as the film-loop former, the film guide plate at the projection window, etc.), and a servomotor 25 (SM) which changes the settings of the switches in unit 24. Also, the projector 1 includes a pulse generator unit 26 of conventional type, comprised of a rotating synchronizer disk sensed by two phototransistors one of which generates frame-counter input pulses for forwards transport and the other for reverse transport.

The central switching unit of the projector 1 is a microcomputer 27 (MC). The operations performed by microcomputer 27 are commanded by the operation-command switches at the command panel 8. The operations performed by microcomputer 27, and how it is programmed to perform these, are explained in the copending application identified earlier. However, from the viewpoint of what the operator does, the operations commanded by the switches at command panel 8 are briefly reviewed as follows:

Switch 28 (SE):

The operator presses this switch once, to erase the most recently stored frame count. For example, after the operator has tried to cue in the start of a scene and then stored that frame count, if he is dissatisified with his attempt, he presses switch 28 and tries again. If switch 28 is pressed twice, not once, than the two most recently stored frame counts are erased. For example, after the operator has stored the frame counts for both the start and end of the first scene, he may be dissastisfied with both, and wish to do the whole scene over.

Switch 29 (SU):

When the operator wishes to go to the next scene, he presses this switch. For example, after the dubbing of one scene has been completed, the operator may go on to the dubbing of the next scene. The dubbing of each scene is semiautomatically performed in dependence upon the scene-start and scene-end frame counts. Thus, when going on to the next scene, the scene-start and scene-end frame counts for the next scene must now be used as reference information. When the operator presses this switch 29 (SU), the scene-end frame count for the scene just worked on automatically converts into the scene-start frame count for the next scene to be worked on.

Switch 30 (O):

The operator presses this switch to reset the projector's frame counter and thereby also the frame-count indicator 39, for example so that the frame count for the start of the first of the series of scenes will conveniently be zero.

Switch 31 (SP):

This is the store command switch, which the operator presses whenever he wishes to store the frame count of the frame currently being projected. For example, when trying to establish the end of the scene, the film is forwards-transported and projected, and as soon as the operator sees the end of the scene being projected, he immediately presses store switch 31 (SP). The microcomputer is capable of storing a number of different frame counts sufficient to include all recording-transition locations likely to be established for the whole film.

Switch 32 (P):

This is a return-to-start switch. When the operator is doing frame-count storing work, scene by scene, on the whole film, e.g., preliminary to any dubbing work at all, and when all storing work is finished, the operator presses this switch 32 (P) and the projector automatically rewinds to a point ahead of the start of the first of the series of scenes. Then, during the subsequent dubbing work, this switch 32 (P) commands a different operation. After the dubbing of any one scene has been finished, and the operator wants to play back the just-finished scene to evaluate success, he presses this switch 32 (P) and the projector automatically rewinds to a point ahead of the start of the just-finished scene.

Switch 33 (R2):

The operator presses this switch to command reverse transport and projection at 2 frames per second, with attenuated projection light to prevent damage to the slowly transported film.

Switch 34 (E):

The operator presses this switch for film thread-in with the projector lamp shut off.

Switch 36 (SG):

The operator presses this switch to command high-speed film transport, for both forwards and reverse transport, will full projection light.

Switch 37 (R):

This switch, too, is pressed to command reverse film transport with reduced projection light.

Switch 38 (STOP):

The operator presses this switch to stop the projector, i.e., to terminate film transport if not already terminated and shut off the projection lamp.

The projection lamp 23 is controlled by the microcomputer 27, via a relay 40, to assume either a full-light state (I) or a reduced-light state (II). The projector motor 22 is controlled by the microcomputer 27, via an electronic switching unit 41, for both forwards (V) and reverse (R) film transport. The rpm-regulation of the projector motor 22 is likewise performed by the microcomputer 27, via lines 42 and 43. The selector switch 12 is used to select different types of recording-transition effects. It has three lines 44, 45, 46 connected to the microcomputer 27, respectively associated with the commands fadeover, soft (gradual) fade-in and hard (abrupt) fade-in. The connection between the magnetic-type playback machine 19 (TR) and the microcomputer 27 is effected via line 50. The central switching and control unit 24 is connected to microcomputer 27 via lines 51, 52, 53, 54, 55. The servomotor 25, which changes the settings of the unit 24, is controlled by the microcomputer via lines 56, 57, 58 and a switching unit 59. The amplifier unit 47 of the projector's audio recording/playback system is connected via lines 48 and 49 to the microcomputer 27, which furnishes signals for switching the amplifier unit on and off, between record and playback modes, and for varying the amplifier gain to implement audio fade-ins, fade-outs and fadeovers.

In FIG. 2 the frame-count display unit 39 is a conventional 5-digit display unit of the 7-segment-digit type, with decimal-point capability. The control of the digit-segments and decimal-point places of the display unit 39 is performed internally by the microcomputer, but through the intermediary of a (schematically represented) driver stage 60. To keep a running frame count, the microcomputer 27 counts the incoming pulses from pulse generator 26, i.e., counts the pulses coming in on line 61 or 62, depending upon whether the film is in forwards or in reverse transport.

Whereas the illumination of the digit segments of the 7-segment-digit 5-digit display unit 39 is performed by the microcomputer 27 in response to counted input pulses, the illumination of the decimal point places of the display unit 39 is performed by the microcomputer 27 in response to operator activation of the store switch 31 (SP). Specifically, each time the operator activates the store switch 31 (SP), the current frame count is stored and (except for the first such activation) the number of illuminated decimal-point places of the display unit 39 increases by one. The first time the operator activates the store switch 31 (SP), to define the start of the first scene, no decimal-point places become illuminated; instead, the illuminated digits of the display unit 39 go dark for a brief interval, to indicate to the operator that he has stored the first-scene scene-start frame count, but that he has not yet defined the first scene because he has not yet stored the first-scene scene-end frame count.

FIG. 3 depicts how the number of illuminated decimal-point places increases, both during the course of frame-count storing work, and during post-storing work on the successive scenes. As clearly shown, the 5-digit display unit is arranged upside-down, i.e., so that the illuminatable decimal-point places are located at the tops, not the bottoms, of the 7-segment digit zones. Of course, inverting the display unit in this way does not change the geometry of the 7-segment digit zones, and the 7 segments of each zone can be illuminated in combinations to generate a non-inverted frame count of ordinary appearance.

As FIG. 3 shows, to indicate the first scene (defined by frame counts $x_0$ and $x_1$), the rightmost decimal-point place is illuminated, and only this place. To indicate the second scene (defined by frame counts $x_1$ and $x_2$) only the rightmost two decimal-point places are illuminated. Likewise, to indicate the third scene (defined by frame counts $x_2$ and $x_3$), only the rightmost three decimal-point places are illuminated. And so forth.

Additionally, the microcomputer 27 is programmed to respond to each activation of store switch 31 (SP) by comparing the frame count whose storage is being commanded against the most recently stored (i.e., highest) of the already stored frame counts. If the frame count whose storage is being commanded is lower than the most recently stored one of the already stored frame counts, the microcomputer 27 causes an immediate change of the characters displayed on frame-count display 39. Preferably, the digit-segments of the display unit 39 are illuminated to spell out the word "ERROR."

This informs the operator that he is improperly attempting to establish a scene-transition location which is in the middle of an already established scene; preferably, when this situation is detected, the microcomputer 27 will additionally not store the improper frame count. Of course, if the operator wishes to change the end count of the scene thusly intruded into, he can do this by pressing the erase switch 28 (SE), which simply erases the most recently stored (highest) frame count, and then store a new end count for this scene.

FIG. 4 tabulates the display sequence for a concrete case of frame-count storing work, followed by corresponding post-storing recording work.

Initially, before the operator has stored the frame count for the start of the first scene, none of the decimal-point places of display unit are illuminated. Then, with the film forwards transported and projected or else at a standstill, the operator projects the start of the first scene and presses store switch 31 (SP) a first time. This stores the first-scene scene-start frame count $x_0$. The illuminatable digit-segments of the display unit 39 all go dark for a brief time interval, to indicate to the operator that he has stored the first-scene scene-start frame count $x_0$.

The operator then searches for the end of the first scene and when he decides where it is to be, i.e., during projection of it, he presses store switch 31 (SP) a second time. This stores the first-scene scene-end frame count $x_1$. As indicated in the second line of FIG. 4, the first scene has now been defined, and the rightmost one of the decimal-point places 64 becomes illuminated, to indicate that the first scene has been defined. The first-scene scene-end frame count $x_2$ also constitutes the second-scene scene-start frame count. Accordingly, the operator then searches for the end of the second scene and when he decides where it is to be, i.e., during projection of it, he presses store switch 31 (SP) a third time. This stores the second-scene scene-end count $x_2$ and thereby defines the second scene. Now, the two rightmost decimal-point places 64 become illuminated. The fourth time the operator presses store switch 31 (SP), this defines the third scene and the three rightmost decimal-point places 64 become illuminated. And so forth.

If, for example, right after storing the second-scene scene-end frame count, the operator decides he has not properly done so, then he would press erase switch 28 (SE), thereby erasing the second-scene scene-end frame count, and the second scene would cease to be defined. Accordingly, the next-to-rightmost illuminated decimal-point place 64 goes dark, only the rightmost place 64 remaining illuminated, to indicate that now only the first scene has been defined.

Eventually, all scenes to be defined are defined, and the frame-count storing work is over. The operator then presses switch 32 (P), and the film is automatically rewound to a point ahead of the start of the first scene. When this point is reached, only the right-most decimal-point place 64 is illuminated, this now indicating that work is being done or is about to be done on the first scene; in this line of FIG. 4, the three empty circles correspond to those scenes which have been defined but which are not yet to be worked on. The operator then performs the dubbing or rerecording of the first scene, e.g., in the manner described in the copending commonly owned application identified earlier.

When the work on the first scene is completed, the operator presses scene-changeover switch 29 (SU). As a result, the first-scene scene-end count replaces the first-scene scene-start count, and the second-scene scene-end count replaces the first-scene scene-end count. Now, the two rightmost decimal-point places 64 are illuminated, indicating that work is about to be done or is being done on the second scene.

To work on the third scene, the operator again presses scene-changeover switch 29 (SU), and then does his work on the third scene. To work on the fourth scene, the operator again presses switch 29 (SU) and does his work. The work on all four scenes is now finished. Now, for example, the operator once more presses scene-changeover switch 29 (SU). Because work on the last of the defined scenes has already been finished, the system again references itself back to the start and end frame counts on the first scene. When the operator has finished all work and is satisfied, he presses erase switch 28 (SE) a first time, thereby erasing the highest stored frame count, i.e., the fourth-scene scene-end frame count; this is indicated in FIG. 4 by the disappearance of the leftmost empty circle. The operator presses erase switch 28 (SE) a second time, to erase the now highest stored frame count, and over and over until he has erased all stored frame counts, except for the first-scene scene-start and scene-end frame counts. At this point, only the rightmost decimal-point place 64 is still illuminated, the first scene still being defined. The operator presses the erase switch once more, to erase the first-scene scene-end frame count. In response to this, the rightmost decimal-point place 64 continues to be illuminated, indicating that the clearing work is not yet finished. Then the operator presses the erase switch a final time, to erase the first-scene scene-start frame count, and the rightmost decimal-point places 64 goes dark, indicating that the system has been cleared.

It will be understood that each of the elements described above, or two or more together, may also find a useful application in other types of constructions differing from the types described above.

While the invention has been illustrated and described as embodied in a particular type of projector adapted for dubbing or rerecording work, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a projector for sound motion-picture film, the projector being of the type provided with film transport means for transporting the film forwards and backwards, frame-counting means for keeping a running count of the number of the frame being projected at any given time, and operator-activated storage means operative when activated for storing frame counts which are to constitute transition locations defining the starts and ends of scenes on the film, in combination therewith, a display arrangement for displaying both the current frame count and also information identifying the thusly defined scenes, the display arrangement comprising a multi-digit display unit having a plurality of controllable digit zones and a plurality of controllable decimal-point places, and display-control means cooperating with the frame-counting and storage means and operative for controlling the controllable digit zones to effect display of frame counts and controlling which decimal-point places are made visible at any given time to indicate by means of different ones of the decimal-point places different ones of the thusly defined scenes.

2. In a projector as defined in claim 1, said display-control means being operative for causing different numbers of the controllable decimal-point places to be made visible to indicate different ones of the scenes by means of the number of decimal-point places made visible at any given time.

3. In a projector as defined in claim 1, the multi-digit display unit being a non-mechanical electronic display unit.

4. In a projector as defined in claim 1, the projector comprising a microcomputer operating as said frame-counting, storage and display-control means.

5. In a projector as defined in claim 1, the multi-digit display unit being of the type comprising a row of controllable digit zones and a row of controllable decimal point places located near the bottoms of the digit zones when the display unit is upright, the multi-digit display unit being mounted on the projector upside-down so that the controllable decimal-point places are located near the tops of the digit zones, whereby to remind the operator that the significance of the decimal-point places is not ordinary decimal-point significance.

6. In a projector as defined in claim 5, the digit zones of the multi-digit display unit being of the 7-segment type.

7. In a projector as defined in claim 1, the display-control means being operative to detect when the operator attempts to store a frame count which is lower than the highest of the already stored frame counts and in response to such detection causing the multi-digit display unit to provide an error indication distinguishable from normal frame-count display.

8. In a projector as defined in claim 7, the multi-digit display unit being of the type comprising a plurality of digit zones, each digit zone comprising a plurality of controllable segments, the error indication being the word "ERROR" spelled out upon the controllable segments of the digit zones.

* * * * *